United States Patent [19]

Davis et al.

[11] Patent Number: 5,322,619

[45] Date of Patent: * Jun. 21, 1994

[54] FCC FOR PRODUCING LOW EMISSION FUELS FROM HIGH HYDROGEN AND LOW NITROGEN AND AROMATIC FEEDS WITH RARE EARTH PROMOTED CATALYST

[75] Inventors: Stephen M. Davis; William E. Winter; Daniel F. Ryan, all of Baton Rouge, La.

[73] Assignee: Exxon Research and Engineering Company, Florham Park, N.J.

[ * ] Notice: The portion of the term of this patent subsequent to May 24, 2011 has been disclaimed.

[21] Appl. No.: 982,917

[22] Filed: Nov. 30, 1992

[51] Int. Cl.$^5$ .................. C10G 11/05; C10G 11/18
[52] U.S. Cl. ................................... 208/120; 208/61; 208/89; 208/113
[58] Field of Search ................... 208/120, 89, 61, 113

[56] References Cited

U.S. PATENT DOCUMENTS 4,260,475 4/1981 Scott ................................ 208/113

Primary Examiner—R. Bruce Breneman
Assistant Examiner—Lorna M. Douyon
Attorney, Agent, or Firm—Henry E. Naylor

[57] ABSTRACT

A fluid catalytic cracking process for producing relatively low emissions fuels. The feedstock is relatively low in nitrogen and aromatics and high in hydrogen content and the catalyst is a rare-earth promoted amorphous silica-alumina catalyst. The feedstock can be characterized as having less than about 50 wppm nitrogen; greater than about 13 wt. % hydrogen; less than about 7.5 wt. % 2+ ring aromatic cores; and not more than about 15 wt. % aromatic cores overall.

9 Claims, No Drawings

FCC FOR PRODUCING LOW EMISSION FUELS FROM HIGH HYDROGEN AND LOW NITROGEN AND AROMATIC FEEDS WITH RARE EARTH PROMOTED CATALYST

FIELD OF THE INVENTION

The present invention relates to a fluid catalytic cracking process for producing low emissions fuels. The feedstocks used in the present invention are exceptionally low in nitrogen and aromatics and high in hydrogen. The catalyst is a rare-earth promoted amorphous acidic catalytic material. The feedstock can be characterized as having less than about 50 wppm nitrogen; greater than about 13 wt. % hydrogen; less than about 7.5 wt. % of 2+ ring aromatic cores; and not more than about 15 wt. % aromatic cores overall.

BACKGROUND OF THE INVENTION

Catalytic cracking is an established and widely used process in the petroleum refining industry for converting petroleum oils of relatively high boiling point to more valuable lower boiling products including gasoline and middle distillates, such as kerosene, jet fuel and heating oil. The pre-eminent catalytic cracking process now in use is the fluid catalytic cracking process (FCC) in which a pre-heated feed is brought into contact with a hot cracking catalyst which is in the form of a fine powder, typically having a particle size of about 10–300 microns, usually about 100 microns, for the desired cracking reactions to take place. During the cracking, coke and hydrocarbonaceous material are deposited on the catalyst particles. This results in a loss of catalyst activity and selectivity. The coked catalyst particles, and associated hydrocarbon material, are subjected to a stripping process, usually with steam, to remove as much of the hydrocarbon material as technically and economically feasible. The stripped particles, containing non-strippable coke, are removed from the stripper and sent to a regenerator where the coked catalyst particles are regenerated by being contacted with air, or a mixture of air and oxygen, at elevated temperature. This results in the combustion of the coke which is a strongly exothermic reaction which, besides removing the coke, serves to heat the catalyst to the temperatures appropriate for the endothermic cracking reaction. The process is carried out in an integrated unit comprising the cracking reactor, the stripper, the regenerator, and the appropriate ancillary equipment. The catalyst is continuously circulated from the reactor or reaction zone, to the stripper and then to the regenerator and back to the reactor. The circulation rate is typically adjusted relative to the feed rate of the oil to maintain a heat balanced operation in which the heat produced in the regenerator is sufficient for maintaining the cracking reaction with the circulating, regenerated catalyst being used as the heat transfer medium. Typical fluid catalytic cracking processes are described in the monograph *Fluid Catalytic Cracking with Zeolite Catalysts*, Venuto, P. B. and Habib, E. T., Marcel Dekker Inc. N.Y. 1979, which is incorporated herein by reference. As described in this monograph, catalysts which are conventionally used are based on zeolites, especially the large pore synthetic faujasites, zeolites X and Y.

Typical feeds to a catalytic cracker can generally be characterized as being a relatively high boiling oil or residuum, either on its own, or mixed with other fractions, also usually of a relatively high boiling point. The most common feeds are gas oils, that is, high boiling, non-residual oils, with an initial boiling point usually above about 230° C., more commonly above about 350° C., with end points of up to about 620° C. Typical gas oils include straight run (atmospheric) gas oil, vacuum gas oil, and coker gas oil.

While such conventional fluid catalytic cracking processes are suitable for producing conventional transportation fuels, such fuels are generally unable to meet the more demanding requirements of low emissions fuels. To meet low emissions standards, the fuel products must be relatively low in sulfur, nitrogen, and aromatics, especially multiring aromatics. Conventional fluid catalytic cracking is unable to meet such standards. These standards will require either further changes in the FCC process, catalysts, or post-treating of all FCC products. Since post-treating to remove aromatics from gasoline or distillate fuels is particularly expensive, there are large incentives to limit the production of aromatics in the FCC process. Consequently, there exists a need in the art for methods of producing large quantities of low emission transportation fuels, such as gasoline and distillates.

SUMMARY OF THE INVENTION

In accordance with the present invention, there is provided a fluid catalytic cracking process for producing low emissions fuel products, which process comprises:

(a) introducing a hydrocarbonaceous feedstock into a reaction zone of a catalytic cracking process unit comprised of a reaction zone and a regeneration zone, which feedstock is characterized as having: a boiling point from about 230° C. to about 350° C., with end points up to about 620° C.; a nitrogen content less than about 50 wppm; a hydrogen content in excess of about 13 wt. %; a 2+ ring aromatic core content of less than about 7.5 wt. %; and an overall aromatic core content of less than about 15 wt. %;

(b) catalytically cracking said feedstock in said reaction zone at a temperature from about 450° C. to about 600° C., by causing the feedstock to be in contact with a cracking catalyst for a contact time of about 0.5 to 5 seconds, which cracking catalyst is a rare-earth promoted amorphous acidic catalytic material, thereby producing lower boiling products and catalyst particles having deposited thereon coke and hydrocarbonaceous material;

(c) stripping said coked catalyst particles with a stripping medium in a stripping zone to remove therefrom at least a portion of said hydrocarbonaceous material;

(d) recovering said hydrocarbonaceous material from the stripping zone;

(e) regenerating said coked catalyst in a regeneration zone by burning-off a substantial amount of the coke on said catalyst, and optionally an added fuel component to maintain the regenerated catalyst at a temperature which will maintain the catalytic cracking reactor at a temperature from about 450° C. to about 600° C.; and (f) recycling said regenerated catalyst to the reaction zone.

In preferred embodiments of the present invention, an added fuel component is used in the regeneration zone and is selected from: $C_2-$ light gases from the catalytic cracking unit, and natural gas.

In preferred embodiments of the present invention the catalyst is an amorphous silica-alumina having about 10 to 40 wt. % alumina and 0.3 to 5 wt. % rare earth oxides.

In other preferred embodiments of the present invention the contact time in the cracking unit is about 0.5 to 3 seconds.

DETAILED DESCRIPTION OF THE INVENTION

The practice of the present invention results in the production of less aromatic naphtha products as well as the production of more $C_3$ and $C_4$ olefins which can be converted to high octane, non-aromatic alkylates, such as methyl tertiary butyl ether.

Feedstocks which are suitable for being converted in accordance with the present invention are any of those hydrocarbonaceous feedstocks which are conventional feedstocks for fluid catalytic cracking and which have an initial boiling point of about 230° C. to about 350° C., with an end point up to about 620° C. The feedstocks of the present invention must also contain no more than about 50 wppm nitrogen, no more than about 7.5 wt. % 2+ ring aromatic cores, no more than about 15 wt. % aromatic cores overall, and at least about 13 wt. % hydrogen. Non-limiting examples of such feeds include the non-residual petroleum based oils such as straight run (atmospheric) gas oil, vacuum gas oil and coker gas oil. Oils from synthetic sources such as coal liquefaction, shale oil, or other synthetic processes may also yield high boiling fractions which may be catalytically cracked either on their own or in admixture with oils of petroleum origin. Feedstocks which are suitable for use in the practice of the present invention may not be readily available in a refinery. This is because typical refinery streams in the boiling point range of interest which are conventionally used for fluid catalytic cracking, generally contain too high a content of undesirable components such as nitrogen, sulfur, and aromatics. Consequently, such streams will need to be upgraded, or treated to lower the level of such undesirable components. Non-limiting methods for upgrading such streams include hydrotreating in the presence of hydrogen and a supported Mo containing catalyst with Ni and/or Co; extraction methods, including solvent extraction as well as the use of solid absorbents, such as various molecular sieves. It is preferred to hydrotreat the streams.

Any suitable conventional hydrotreating process can be used as long as it results in a stream having the characteristics of nitrogen, sulfur, and aromatics level previously mentioned. That is nitrogen levels of less than about 50 wppm, preferably less than about 30 wppm, preferably less than about 15 wppm, most preferably less than about 5 wppm; a hydrogen content of greater than about 13 wt. %, preferably greater than about 13.5 wt. %; a 2+ ring aromatic core content of less than about 7.5 wt. %, preferably less than about 4 wt. %; and an overall aromatic core content of less than about 15 wt. %, preferably less than about 8 wt. %.

Suitable hydrotreating catalysts are those which are typically comprised of a Group VIB (according to the Sargeant-Welch Scientific Company Periodic Table) metal with one or more Group VIII metals as promoters, on a refractory support. It is preferred that the Group VI metal be molybdenum or tungsten, more preferably molybdenum. Nickel and cobalt are the preferred Group VIII metals with alumina being the preferred support. The Group VIII metal is present in an amount ranging from about 2 to 20 wt. %, expressed as the metal oxides, preferably from about 4 to 12 wt. %. The Group VI metal is present in an amount ranging from about 5 to 50 wt. %, preferably from about 10 to 40 wt. %, and more preferably from about 20 to 30 wt. %. All metals weight percents are based on the total weight of the catalyst. Any suitable refractory support can be used. Such supports are typically inorganic oxides, such as alumina, silica, silica-alumina, titania, and the like. Preferred is alumina.

Suitable hydrotreating conditions include temperatures ranging from about 250° to 450° C., preferably from about 350° C. to 400° C.; pressures from about 250 to 3000 psig; preferably from about 1500 to 2500 psig; hourly space velocities from about 0.05 to 6 V/V/Hr; and a hydrogen gas rate of about 500 to 10000 SCF/B; where SCF/B means *standard cubic feet per barrel, and V/V/Hr means volume of feed per volume of the catalyst per hour.

A hydrocarbonaceous feedstock which meets the aforementioned requirements for producing a low emissions fuel is fed to a conventional fluid catalytic cracking unit. The catalytic cracking process may be carried out in a fixed bed, moving bed, ebullated bed, slurry, transfer line (dispersed phase) riser, or dense bed fluidized bed operation. It is preferred that the catalytic cracking unit be a fluid catalytic cracking (FCC) unit. Such a unit will typically contain a reactor where the hydrocarbonaceous feedstock is brought into contact with hot powdered catalyst particles which were heated in a regenerator. Transfer lines connect the two vessels for moving catalyst particles back and forth. The cracking reaction will preferably be carried out at a temperature from about 450° to about 680° C., more preferably from about 480° to about 560° C.; pressures from about 5 to 60 psig, more preferably from about 5 to 40 psig; contact times (catalyst in contact with feed) of about 0.5 to 10 seconds, more preferably about 1 to 6 seconds; and a catalyst to oil ratio of about 0.5 to 15, more preferably from about 2 to 8. During the cracking reaction, lower boiling products are formed and some hydrocarbonaceous material, and non-volatile coke are deposited on the catalyst particles. The hydrocarbonaceous material is removed by stripping, preferably with steam. The non-volatile coke is typically comprised of highly condensed aromatic hydrocarbons which generally contain about 4 to 10 wt. % hydrogen. As hydrocarbonaceous material and coke build up on the catalyst, the activity of the catalyst for cracking, and the selectivity of the catalyst for producing gasoline blending stock, are diminished. The catalyst particles can recover a major proportion of their original capabilities by removal of most of the hydrocarbonaceous material by stripping and the coke by a suitable oxidative regeneration process. Consequently, the catalyst particles are sent to a stripper and then to a regenerator.

Catalyst regeneration is accomplished by burning the coke deposits from the catalyst surface with an oxygen-containing gas, such as air. Catalyst temperatures during regeneration may range from about 560° C. to about 760° C. The regenerated, hot catalyst particles are then transferred back to the reactor via a transfer line and, because of their heat, are able to maintain the reactor at the temperature necessary for the cracking reactions. Coke burn-off is an exothermic reaction, therefore in a conventional fluid catalytic cracking unit with conventional feeds, no additional fuel needs to be added. The feedstocks used in the practice of the present invention, primarily because of their low levels of aromatics, and also due to the relatively short contact times in the reactor or transfer line, do not deposit enough coke on the catalyst particles to achieve the necessary temperatures in the regenerator. Therefore, it will be necessary to use an additional fuel to provide increased temperatures in the regenerator so the catalyst particles returning to the reactor are hot enough to maintain the cracking reaction. Non-limiting examples of suitable additional fuel include $C_2^-$ gases from the catalytic cracking process itself; natural gas; and any other non-residual petroleum stream in a suitable boiling range. Such additional fuels are sometimes referred to as torch oils. Preferred are the $C_2^-$ gases.

Catalysts suitable for use in the present invention are selected from the rare-earth promoted amorphous acidic catalytic materials. It is preferred that the amorphous acidic material have a surface area after commercial deactivation, or after steaming at 760° C. for 16 hrs, from about 75 to 200 m²/g, more preferably from about 100 to 150 m²/g. Amorphous acidic catalytic materials suitable for use herein include: alumina, silica-alumina, silica-magnesia, silica-zirconia, silica-thoria, silica-beryllia, silica-titania, and the like. Preferred is a silica-alumina material having from about 10 to 40 wt. % alumina. Such materials will typically have a pore volume of at least about 0.3 cc per gram. In general, higher pore volumes are preferred as long as they are not so high as to adversely affect the attrition resistance of the catalyst. Thus, the pore volume of the amorphous catalytic material will be at least about 0.3 cc per gram, preferably from about 0.4 to 1.5 cc per gram, and more preferably from about 0.8 to 1.3 cc per gram, and most preferably from about 1 to 1.2 cc per gram. Generally, the particle size of the catalyst will be in the range typically used for fluid bed catalysts. Generally this size will range from about 10 to 300 microns in diameter, with an average particle diameter of about 60 microns.

The rare-earth amorphous materials of the present invention can be produced by any suitable means, such as by ion-exchange and impregnation methods. One preferred method comprises treating the amorphous material with a fluid medium, preferably a liquid medium, containing cations of at least one rare earth. Rare earth metal salts represent the source of the rare earth cations. The product resulting from treatment with a fluid medium is an activated amorphous catalytic material which has been modified primarily to the extent of having the rare earth cations chemisorbed or ionically bonded thereto.

Water is the preferred solvent for the cationic salt, e.g. rare-earth metal salt, for reasons of economy and ease of preparation in large scale operations, involving continuous or batchwise treatment. Similarly, for this reason, organic solvents are less preferred but can be employed providing the solvent permits ionization of the cationic salt. Typical solvents include cyclic and acyclic ethers such as dioxane, tetrahydrofuran, ethyl ether, diethyl ether, diisopropyl ether, and the like; ketones, such as acetone and methyl ethyl ketone; esters such as ethyl acetate; alcohols such as ethanol, propanol, butanol, etc; and miscellaneous solvents such as dimethylformamide, and the like.

A wide variety of rare earth compounds can be employed as a source of rare earth ions. Non-limiting examples of such compounds include rare earth salts, such as the chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular rare earth metal salt or salts employed is that it is sufficiently soluble in the fluid medium in which it is used to give the necessary rare earth ion transfer. The preferred rare earth salts are the chlorides, nitrates, and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare-earth exchanged amorphous catalyst of the present invention may be modified with a discrete surface silica phase. The discrete surface silica phase will constitute from about 2 to 25 wt. %, preferably from about 4 to 15 wt. %, and more preferably from about 6 to about 12 wt. %, which weight percents are based on the total weight of the catalyst. Such an amount of surface silica will correspond to a silica surface coverage of about 0.2 to 2 monolayers.

The discrete surface silica phase may be deposited onto the amorphous silica-alumina material by use of any appropriate reagent. Preferred reagents include the silicon halides, $Na_2SiO_3$, the silicon alkoxides, and the like. Any appropriate deposition can be used for depositing the surface silica phase. For example, an incipient wetness technique can be used wherein the silicon-containing reagent is dissolved in a suitable wetness, which solution is used to impregnate the silica-alumina material. The so-treated material is then dried and air calcined at a temperature of about 450° C. to about 550° C. for an effective amount of time.

The following examples are presented to illustrate preferred embodiments of the present invention and should not be taken as being limiting in any way.

EXAMPLE 1 (COMPARATIVE)

Cracking tests were conducted in a microactivity test (MAT) unit. Such a test unit is described in the *Oil and Gas Journal,* 1966 Vol. 64, pages 7, 84, 85 and November 22, 1971, pages 60–68, which is incorporated herein by reference. Run conditions in the MAT unit were as follows:

| | |
|---|---|
| Temperature, °C. | 525 |
| Run Time, Sec. | 30 |
| Catalyst Charge, gr. | 4.1 |
| Amount Feed, cc. | 1.1 |
| Cat/Oil ratio | 4.2 to 4.5 |

Tests were made with two fresh, steamed, catalysts. The catalysts were steamed for 16 hours at 760° C. to simulate commercially deactivated catalysts. The first catalyst (ZA) is commercially available from Davison under the tradename Octacat-D. Catalyst ZA contains a USY zeolite (LZY-82 from Union Carbide) but no rare earths. It is formulated in a silica-sol matrix and after steaming, or commercial deactivation, it is a relatively low unit cell size catalyst. The second catalyst was an amorphous silica-alumina gel catalyst, 3A, commercially available from Davison. The composition and properties of catalyst ZA and 3A are as shown below.

| CATALYST | ZA | 3A |
|---|---|---|
| $Al_2O_3$ | 26.0 wt. % | 25 wt. % |
| $SiO_2$ | 73.0 | 75 |

| CATALYST | ZA | 3A |
|---|---|---|
| Re$_2$O$_3$ | 0.02 | 0 |
| Na$_2$O | 0.25 | — |
| After calcination for 4 hrs at 538° C. | | |
| Surface Area, M$^2$/g | 297.5 | — |
| Pore Volume, cc/g | 0.24 | — |
| Unit Cell Size, Å | 24.44 | — |
| After steaming for 16 hrs at 405° C. | | |
| Surface Area, M$^2$/g | 199.5 | 128 |
| Pore Volume, cc/g | 0.20 | 0.49 |
| Unit Cell Size, Å | 24.25 | — |

A raw and two hydrotreated Arab Light VGO (virgin gas oil) streams, were used as feeds for catalytic cracking experiments. A commercially available NiMo on alumina catalyst, available from Ketjen as catalyst KF-843, was used to hydrotreat the feeds. The hydrotreated feed is designated as HA. The 345° C.+ fraction is designated by HA+. The severity of hydrotreating is represented by a number indicating the hydrotreating severity which increases from HA2+ to HA1+. The raw Arab light vacuum gas oil (VGO) is designated as RA. Arab Light VGO is a typical, conventional feedstock for fluid catalytic cracking. The properties of the raw and hydrotreated feeds are set forth in the table below.

| Properties of Raw and Hydrotreated Arab Light VGO | | | |
|---|---|---|---|
| | HA2+ | HA1+ | RA+ |
| Wppm N | 0.7 | <.5 | 596 |
| Wt. % S | <0.01 | <0.01 | 1.99 |
| Wt. % C | 86.11 | 85.70 | 85.86 |
| Wt. % H | 13.89 | 14.30 | 12.09 |
| Wt. % Saturates | 93.7 | 95.7 | 47.8 |
| Wt. % 1 Ring Aromatics | 4.2 | 2.3 | 17.1 |
| Wt. % Total Arom. Cores | 2.0 | 1.3 | 21.5 |
| Wt. % 2 + Ring Cores | 1.4 | 1.0 | 16.8 |

The total liquid product from the MAT tests amounted to about 0.3 to 0.7 grams and was analyzed using two different gas chromatograph instruments. A standard analysis was the boiling point distribution determined by gas chromatographic distillation (GCD) to evaluate: (1) the amount of material boiling less than 15° C.; (2) naphtha boiling between 15° C. and 220° C.; (3) light cat cycle oil (LCCO) boiling between 220° C. and 345° C.; and (4) bottoms boiling above 345° C. For selected tests, another portion of the sample was analyzed on a PIONA instrument which is a multidimensional gas chromatograph (using several columns) to determine the molecular types according to carbon number from C$_3$ to C$_{11}$. The types include normal paraffins, isoparaffins, naphthenes, normal olefins, iso-olefins, cyclo-olefins, and aromatics.

Detailed cracking data are given in Table I below for the raw and hydrotreated Arab Light VGO feeds.

TABLE I

Cracking of Raw Arab Light VGO with Catalyst ZA vs Clean Feed with 3A @ 525° C. and 4.5 Cat/Oil

| Feed | RA+ | HA1+ | HA2+ |
|---|---|---|---|
| Catalyst | ZA | 3A | 3A |
| Conversion (220° C.) | 67.1 | 69.1 | 65.0 |
| Yields. Wt % | | | |
| Coke | 2.35 | 0.37 | 0.69 |
| C$_2^-$ Dry Gas | 2.17 | 1.05 | 1.55 |
| C$_3$H$_6$ | 4.7 | 8.5 | 6.4 |
| C$_3$H$_8$ | 0.95 | 0.71 | 0.43 |
| C$_4$H$_8$ | 5.9 | 13.7 | 10.5 |
| Iso-C$_4$H$_{10}$ | 4.2 | 3.5 | 2.5 |
| N—C$_4$H$_{10}$ | 0.88 | 0.49 | 0.29 |
| 15-220° C. Naphtha | 45.9 | 41.1 | 42.5 |
| LCCO | 15.6 | 2.9 | 6.3 |
| Bottoms | 17.2 | 27.9 | 28.7 |
| 15-220° C. Naphtha | | | |
| Aromatics | 32.4 | 7.5 | 13.3 |
| Olefins | 27.6 | 65.6 | 62.7 |

The above table shows that conversion obtained with the conventional fluid catalytic cracking feed RA+ and zeolitic catalyst ZA is bracketed by the conversions obtained with the two clean feeds of this invention and the amorphous silica-alumina catalyst 3A, a catalyst of this invention. Furthermore, the naphtha produced from the clean feed with a preferred low hydrogen transfer catalyst (3A) is substantially less aromatic than naphtha produced by conventional fluid catalytic cracking. Also, propylene and butylene yields are higher.

EXAMPLE 2

A series of catalysts was investigated in duplicate in another microactivity test (MAT) unit. The tests were run at 482° C. for seconds, with a catalyst to oil ratio of 2.9, and using one of three feeds, as indicated below. One feed was a hydrotreated Arab light vacuum gas oil (VGO) containing about 40 wppm of nitrogen, and 13.4 wt. % hydrogen. The feedstock contained about 82 wt. % of 345° C.+ hydrocarbons. The other feed was a hydroisomerized Fischer Tropsch wax produced by reacting CO and H$_2$ over a CoRe/TiO$_2$ catalyst followed by isomerization to a pumpable liquid using a silica containing CoNiMo/Al$_2$O$_3$ isomerization catalyst. This Fischer Tropsch feed was run at two catalyst to oil ratios of 3.05 and 1.52. This synthetic gas oil was highly paraffinic (about 99%), substantially free of nitrogen, sulfur, and aromatic cores, and the hydroisomerized Fischer Tropsch feed contained about 90 of wt. % 345° +C. hydrocarbons.

Four catalysts were used in this example. One catalyst was the same amorphous silica-alumina gel catalyst, 3A described in Example 1. The other three catalysts were the silica-alumina 3A catalysts which were modified by ion-exchange with rare earth brine (a mixture of aqueous rare-earth salts containing primarily lanthanum and cerium chlorides). The ion-exchange was conducted at room temperature, and the ion-exchanged silica-alumina was collected by filtration. The catalysts were dried at room temperature, and then in vacuum at 100° C., and finally calcined at 500° C. for 3 to 4 hours. The catalysts had rare-earth oxide loadings in the range of 0.5 to 2.5 wt. %. Catalyst B had a 1.7 wt. % rare-earth content, catalyst C had a 0.5 wt. % rare-earth content, and catalyst D had a 2.5 wt. % rare earth content. These materials were steamed at 760° C. overnight prior to the microactivity tests.

Table II below summarizes activity and selectivity data from the microactivity tests. Specific coke represents the coke yield divided by the fractional conversion divided by one minus the fractional conversion. This corresponds to the selectivity for producing coke.

The ratio of $C_4=/C_4$ represents the product ratio for $C_4$-olefins ($C_4=$) to $C_4$ paraffins and is used to distinguish different selectivity patterns for producing olefinic light products. The $C_4=/C_4$ was determined by mass spectrophotometry.

TABLE II

| Catalyst | Conversion wt. % | Yields wt. % Coke | $H_2$ | Specific Coke | $C_4=/C_4$ |
|---|---|---|---|---|---|
| I. Feed = hydrotreated Arab light VGO: cat/oil = 2.9 | | | | | |
| 3A | 68.8 | 0.973 | 0.043 | 0.44 | 1.07 |
| B | 58.0 | 0.260 | 0.031 | 0.19 | — |
| B | 59.0 | 0.029 | 0.015 | 0.02 | 1.73 |
| II. Feed = hydroisomerized Fischer Tropsch wax: cat/oil = 3.05 | | | | | |
| 3A | 75.2 | 0.366 | 0.0097 | 0.12 | 3.90 |
| B | 79.8 | 0.153 | 0.0066 | 0.04 | 3.70 |
| III. Feed = hydroisomerized Fischer Tropsch wax: cat/oil = 1.52 | | | | | |
| 3A | 68.9 | 0.214 | 0.0097 | 0.10 | — |
| C | 73.3 | 0.091 | 0.0050 | 0.03 | — |
| D | 63.4 | 0.061 | 0.0055 | 0.035 | — |

The above table shows that rare-earth exchanged amorphous silica-alumina catalysts reduce selectivity for coke make. A relatively small activity debit is noted for the hydrotreated Arab light VGO, together with increased olefin to paraffin ratios. Activity for modified and unmodified catalysts was similar for the hydroisomerized Fischer Tropsch wax feed. Results of Example 2 show that high yields of light olefins obtained by cracking clean FCC feeds of this invention with an amorphous silica alumina catalyst can be improved further with catalysts of this invention. Furthermore, the low coke yields indicate rare-earth exchanged catalysts of this invention produce less aromatic products.

EXAMPLE 3

A microactivity test was performed according to Example 1 above, except with a rare-earth exchanged amorphous silica-alumina catalyst modified with surface silica. The surface silica was applied to the catalyst by impregnating an amorphous silica-alumina (3A) catalyst with ethyl orthosilicate in isopropanol to the point of incipient wetness, followed by air drying for 16 hours at room temperature, vacuum drying for 16 hours at 100° C., and air calcination at 550° C. for 3 hours. The silica surface treated catalyst was then ion-exchanged as in Example 1 above. The silica surface treated catalyst (Catalyst E) was steamed overnight at 760° C. prior to the microactivity test. As shown in Table III below, the resulting catalyst provided improved coke and $C_4$-olefin selectivities along with a modest activity debit relative to the 3A catalyst during cracking of the hydrotreated Arab light VGO feedstock at 482° C., 80 seconds, and with a catalyst to oil ratio of 2.9. These results also show cracking clean feeds with rare earth exchanged catalysts of this invention enhances light olefins yields for alkylation MTBE production.

TABLE III

| Catalyst | Conv. wt. % | Yields wt. % Coke | $H_2$ | Specific Coke | $C_4=/C_4$ |
|---|---|---|---|---|---|
| 3A | 68.8 | 0.973 | 0.043 | 0.44 | 1.07 |
| E | 53.2 | 0.260 | 0.016 | 0.23 | 2.13 |

EXAMPLE 4

Microactivity tests were also carried out in accordance with Example 1 above, with a rare-earth exchanged amorphous catalyst of the present invention, but on a conventional, non-hydrotreated petroleum gas oil feedstock containing 633 wppm nitrogen, and 12.35 wt. % hydrogen. As can be seen in Table IV below, in sharp contrast to the clean feeds of Examples 1 and 2, no advantages in either coke selectivity or catalytic activity could be detected for the rare-earth modified catalyst. Therefore, the preferred application of the rare-earth modified amorphous catalyst is limited to clean feeds of the present invention. It will be noted that all of the coke selectivities are much larger than those obtained with ultraclean feeds.

TABLE IV

| Catalyst | Conv. wt. % | Yields wt. % Coke | $H_2$ | Specific Coke |
|---|---|---|---|---|
| 3A | 53.7 | 1.59 | 0.025 | 1.37 |
| B | 56.3 | 1.74 | 0.022 | 1.35 |

What is claimed is:

1. A fluid catalytic cracking process for producing low emission fuel products, which process comprises:
   (a) introducing a hydrocarbonaceous feedstock into a reaction zone of a catalytic cracking process unit comprised of a reaction zone, and a regeneration zone, which feedstock is characterized as having: an initial boiling point from about 230° C. to about 350° C., with end points up to about 620° C.; a nitrogen content less than about 50 wppm; a hydrogen content in excess of about 13 wt. %; a 2+ ring aromatic core content of less than about 7.5 wt. %; and an overall aromatic core content of less than about 15 wt. %;
   (b) catalytically cracking said feedstock in said reaction zone at a temperature from about 450° C. to about 600° C., by causing the feedstock to be in contact with a cracking catalyst for a contact time of about 0.5 to 5 seconds, which cracking catalyst is a rare-earth promoted amorphous acidic catalytic material having a surface area, after steaming at 760° C. for 16 hours, from about 75 to 200 $m^2/g$, thereby producing lower boiling products and catalyst particles having deposited thereon coke and hydrocarbonaceous material;
   (c) stripping said coked catalyst particles with a stripping medium in a stripping zone to remove therefrom at least a portion of said hydrocarbonaceous material;
   (d) recovering said hydrocarbonaceous material from the stripping zone;
   (e) regenerating said coked catalyst in a regeneration zone by burning-off a substantial amount of the coke on said catalyst, and optionally an added fuel component to maintain the regenerated catalyst at a temperature which will maintain the catalytic cracking reactor at a temperature from about 450° C. to about 600° C.; and
   (f) recycling said regenerated catalyst to the reaction zone.

2. The process of claim 1 wherein the amorphous catalytic material is a silica-alumina material.

3. The process of claim 2 wherein the rare earth metal is selected from the group consisting of lanthanum and cerium.

4. The process of claim 2 wherein the alumina content of the silica-alumina material, excluding the surface silica, is from about 10 to 40 wt. %, based on the total weight of the catalyst.

5. The process of claim 4 wherein the hydrocarbonaceous feedstock contains: less than about 20 wppm nitrogen, greater than about 13.5 wt. % hydrogen, less than about 4 wt. % of 2+ring aromatic cores, and an overall aromatic core content of less than about 8 wt. %.

6. The process of claim 1 wherein an added fuel component is used in the regenerator, which added fuel component is selected from the group consisting of $C_2^-$ gases from the catalytic cracking process itself, and natural gas.

7. The process of claim 1 wherein the rare earth exchanged amorphous catalytic material also contains a discrete surface silica phase, which surface silica phase constitutes from about 2 to 25 wt. % of the catalyst.

8. The process of claim 7 wherein: (i) the rare earth metal is selected from the group consisting of lanthanum and cerium; (ii) the alumina content of the silica-alumina material, excluding the surface silica, is from about 10 to 40 wt. %, based on the total weight of the catalyst; and (iii) the hydrocarbonaceous feedstock contains: less than about 20 wppm nitrogen, greater than about 13.5 wt. % hydrogen, less than about 4 wt. % of 2+ring aromatic cores, and an overall aromatic core content of less than about 8 wt. %.

9. The process of claim 8 wherein an added fuel component is used in the regenerator, which added fuel component is selected from the group consisting of $C_2^-$ gases from the catalytic cracking process itself, and natural gas.

* * * * *